US009897476B1

(12) United States Patent
Bauer

(10) Patent No.: US 9,897,476 B1
(45) Date of Patent: Feb. 20, 2018

(54) MEASURING APPARATUS TO ACCURATELY DETERMINE THE AMOUNT OF MELTED WAX TO BE POURED INTO A CONTAINER FOR THE PURPOSE OF PRODUCING A CANDLE

(71) Applicant: Lucy B. Bauer, Burbank, CA (US)

(72) Inventor: Lucy B. Bauer, Burbank, CA (US)

( * ) Notice: Subject to any disclaimer, the term of this patent is extended or adjusted under 35 U.S.C. 154(b) by 127 days.

(21) Appl. No.: 15/153,162

(22) Filed: May 12, 2016

(51) Int. Cl.
*G01B 3/04* (2006.01)
*G01F 23/00* (2006.01)
*C11C 5/02* (2006.01)

(52) U.S. Cl.
CPC .............. *G01F 23/00* (2013.01); *C11C 5/023* (2013.01); *G01B 3/04* (2013.01)

(58) Field of Classification Search
CPC ...... G01F 23/04; G01F 23/0023; G01F 19/00; G01F 23/0007; G01F 23/02; G01F 23/56; G01F 17/00; C11C 5/008; C11C 5/023; G01B 3/02; G01B 3/20
USPC ........................................................ 33/494
See application file for complete search history.

(56) References Cited

U.S. PATENT DOCUMENTS

| 2,027,494 | A | * | 1/1936 | Trabold ................. G01F 19/00 33/486 |
| 2,507,684 | A | | 5/1950 | Smith |
| 2,607,122 | A | * | 8/1952 | Overmyer .............. G01F 23/04 33/723 |
| 3,672,061 | A | | 6/1972 | Alessi |
| 4,550,602 | A | | 11/1985 | Burke, Sr. et al. |
| 5,566,465 | A | * | 10/1996 | Zoellner ................. B44D 3/08 33/572 |
| 5,910,005 | A | | 6/1999 | Scherr |
| 7,340,953 | B2 | | 3/2008 | Green et al. |
| 7,350,418 | B2 | | 4/2008 | Kosmyna et al. |
| 8,256,130 | B2 | | 9/2012 | Jantz |
| 2003/0154612 | A1 | | 8/2003 | Petri et al. |
| 2014/0290358 | A1 | | 10/2014 | Eiselt |

* cited by examiner

*Primary Examiner* — Yaritza Guadalupe-McCall
(74) *Attorney, Agent, or Firm* — Thomas I. Rozsa

(57) ABSTRACT

A measuring device for measuring the depth of candle wax in a container. The measuring device has a hook that rests on the side of the container while melted hot viscous liquid candle wax is poured from a pouring container into the candle wax container. The user of the present invention can easily see the depth of the candle wax when candle wax is poured into a container by various line markers that correspond to different elevations within the container. The user is also able to measure the distance from the top of the container to the top level of candle wax.

15 Claims, 8 Drawing Sheets

MEASURING APPARATUS TO ACCURATELY DETERMINE THE AMOUNT OF MELTED WAX TO BE POURED INTO A CONTAINER FOR THE PURPOSE OF PRODUCING A CANDLE

BACKGROUND OF THE INVENTION

1. Field of the Invention

The present invention relates to the field of measuring the amount of candle wax poured in a container, taking into account the amount of open space between the top of the container and providing sufficient space for the wick.

2. Description of the Prior Art

The following 9 patents and published patent applications are the closest prior art known to the inventor.

1. U.S. Pat. No. 2,507,684 issued to William C. Smith on May 16, 1950 for "Measuring Tape or Strip for Beverage Bottles" (hereafter the "Smith Patent");

2. U.S. Pat. No. 3,672,061 issued to Frank A. Alessi on Jun. 27, 1972 for "Device for Measuring The Amount of Fluid in Bottles" (hereafter the "Alessi Patent");

3. U.S. Pat. No. 4,550,602 issued to William L. Burke, Sr. et al. on Nov. 5, 1985 for "Liquid Level Marker for Container" (hereafter the "Burke Patent");

4. U.S. Pat. No. 5,910,005 issued to Mark J. Scherr on Jun. 8, 1999 for "Candleforming Method" (hereafter the "Scherr Patent");

5. United States Published Patent Application No. 2003/0154612 to Richard Petri et al. on Aug. 21, 2003 for "Method for Indicating A Pouring Amount for a Pot and Volume Measure Strip Therefor" (hereafter the "Petri Published Patent Application");

6. U.S. Pat. No. 7,340,953 issued to David Green et al. and assigned to Browne & Co. on Mar. 11, 2008 for "Liquid Measuring Vessel" (hereafter the "Green Patent");

7. U.S. Pat. No. 7,350,418 issued to Michael Kosmyna et al. on Apr. 1, 2008 for "Fluid Supply Assembly With Measuring Guide" (hereafter the "Kosmyna Patent");

8. U.S. Pat. No. 8,256,130 issued to Edward Lee Jantz on Sep. 4, 2012 for "Apparatus and Method for Properly Pre-Measuring Turkey Frying Oil" (hereafter the "Jantz Patent")

9. United States Published Patent Application No. 2014/0290358 to Peter Eiselt on Oct. 2, 2014 for "Chemical Measuring Device" (hereafter the "Eiselt Published Patent Application").

The Smith Patent discloses the concept of having a measuring tape placed inside a bottle so that it can be determined how much of the beverage inside the bottle which primarily is alcohol has been consumed or how high the bottle is filled with alcohol. It is strictly a measuring device to determine how much alcohol is in the bottle.

The Alessi Patent discloses a device for measuring the amount of fluid in bottles. Specifically, the patent discloses a device for measuring the amount of fluid remaining in a transparent container, such as a bottle, by positioning a scribed line on a slidable pointer in alignment with the fluid level in the container. The quantity of fluid remaining is read directly on a scale. A separate scale is calibrated for each differently shaped container in terms of the liquid units desired to be measured, such as 11/4 ounce 'jiggers.'

The Burke Patent discloses:

"A device is disclosed for visually sighting the level of a liquid material or a solid particulate material within a container having a container sidewall. The device comprises a handle and a first and a second leg, the first leg having a first top end portion and a first bottom end portion with the second leg having a second top end portion and a second bottom end portion. The first and second top end portions are integrally connected to the handle and spaced apart to accommodate the thickness of the container sidewall. The first and second bottom end portions are spaced apart a distance closer than the first and second top end portions. First and second legs are resilient, enabling the bottom end portions to be separated upon positioning the first and second legs on the external and internal surfaces of the container sidewall with the resiliency of the legs engaging the external and internal surfaces of the container sidewall to maintain the position of the device relative to the container. A first and a second foot attached to the first and second legs respectively provide a line external and internal the container for enabling the operator to determine the level of the material within the container."

The Scherr Patent discloses a candle forming method as best illustrated in FIGS. 7, 8 and 9 wherein it appears that the candle itself is formed exterior to a glass tube and that it is resting adjacent a measuring scale to determine how high the candle has been formed.

The Petri Published Patent Application discloses a method for indicating a pouring amount for a pot and volume measure strip therefor. This deals with the concept of a measuring device and is really more related to pouring a liquid into a pot of a given height.

The Green Patent discloses a liquid measuring vessel. Referring to Column 2 beginning on Line 59 the patent states:

"The liquid measuring vessel 10 further includes a removable clip 24 that is slidingly received on at least a portion of the wall 14 adjacent the indicia 22. In the embodiment shown in FIGS. 1 through 6 the removable clip 24 may be attached to either portion of the wall 14 that includes indicia 22 depending on which measurement is required and on which side that measurement is indicated. The removable clip 24 includes an top surface 30, indicated clearly in FIGS. 4-6, and an internal wall 32 that define a channel 34 between them. In order to attach the removable clip 24 to the wall 14 of the liquid measuring vessel 10 the removable clip 24 is mounted on the wall 14 so that the wall 14 is received within the channel 34 of the removable clip 24. By this placement the top surface 30 is located on the outside of the liquid measuring vessel 10 and the internal surface 32 is located inside the liquid measuring vessel 10."

The Kosmyna Patent discloses a fluid measuring device. Specifically, the patent discloses:

"A fluid supply assembly having a measuring guide comprising a fluid container, a lid, and a measuring guide. A method of measuring fluid components in a fluid supply assembly is also described."

The Jantz Patent discloses a measuring device for measuring oil for frying turkeys.

The Eiselt Published Patent Application discloses a chemical measuring device described as follows:

"The present invention relates to a liquid level measuring system and method comprising: a liquid container; a measuring stick immersed into the liquid container; and a buoyancy ball attached to the immersed end of the measuring stick. The measuring stick may include numerical markers indicating the liquid level within the liquid container. The liquid level measuring system may also include a threaded cap, where the threaded cap receives the measuring stick for insertion into the liquid container."

There is a significant need for performing candle wax measurements to determine an appropriate amount of wax to properly fill a candle jar. More specifically, there is a need to improve upon the way in which candle wax is measured.

SUMMARY OF THE INVENTION

The present invention relates to the field of measuring the amount of candle wax poured in a container, taking into account the amount of open space between the top of the container and providing sufficient space for the wick.

It is an object of the present invention to measure and pour the desired amount of wax into a container to assure a desired height for the wick above the wax and a desired distance between the top of the container and the top of the poured candle wax within containers. The invention specifically measures the distance between the top of the container and the top surface of the candle wax poured into the container.

The present invention is a measuring device for measuring the depth of candle wax in a container. The measuring device has a hook that rests on the side of the container while melted hot viscous liquid candle wax is poured from a pouring container into the candle wax container. The user of the present invention can easily see the depth of the candle wax when candle wax is poured into a container by various line markers that correspond to different elevations within the container. The user is also able to measure the distance from the top of the container to the top level of candle wax. The wick is held in place by a wick retainer retained across the top of the candle container so that the wick will not fall into the wax while the wax is being poured into the candle container. After the wax has hardened, the wick can be cut to a desired distance above the upper circumferential surface of the hardened candle wax and a desired distance below the upper circumferential surface of the candle container.

It is an object of the present invention to have markers such as main distance markers of one inch and interim distance markers of one-quarter inch. These markers traverse the invention so that when the candle wax is poured into the candle container, the depth of the poured candle wax and the distance of the upper circumferential surface of the candle wax below the top surface of the candle container can be readily observed from reading the line markers on the present invention.

It is also an object of the present invention to have a hook section that rests on the side of the container. This allows the measuring apparatus to remain in a locked position for more consistent measurements. It is also an object of the present invention for the present invention to rest upon a multitude of different shaped containers such as cylindrical, square rectangular, or oval to list a few.

It is an additional object of the present invention to have line markers on the front surface, first side surface, rear surface and second side surface of the measuring apparatus. These line markers will allow the user to readily observe the measured depth of the poured candle wax and to pour the candle wax up to a desired distance below the top of the candle wax holder.

It is a further object of the present invention to provide different shaped and sized hooks that will rest on a multitude of candle wax containers. The top of the present invention can be curved between the hook retaining portion and the marked distance measuring portion of the present invention. Alternatively, the top of the present measuring invention can have a straight upper circumferential surface between the hook retaining portion and the marked distance measuring portion of the present invention.

It is an object of the present invention to provide a hooked measuring apparatus where the distance between the lowermost tip of the hook and the location where the hooked top of the measuring apparatus rests on the exterior circumference of the container into which wax is poured is of a sufficient distance to prevent the measuring apparatus from falling off the container while the hot wax is being poured into the container. A preferred minimum distance is $3/8$ of an inch, with a range of between $1/4$ inch and $1/2$ inch being within the spirit and scope of the present invention.

It is also an object of the present invention to have the uppermost line mark at an elevation aligned with the tip of the hook so that wax will not be poured into the container where the wax comes in contact with the hook of the measuring apparatus.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is used after the liquid candle wax is prepared using any one or more of traditional candle wax preparation methods. By way of example, wax such as soy wax or paraffin wax comes in the form of flakes or solid chunk respectively. The wax is heated in a pot until the wax is melted into a liquid. Usually, the temperature to melt the wax is traditionally in the range of 125 degrees Fahrenheit to 185 degrees Fahrenheit. During the melting process, scents such as aroma oils or powder are added. For hand made wax candles, the wax flakes and scent are placed into a pouring container. Preferably, the pouring container has a handle made of low-heat transferring material such as plastic, wood, ceramics. A melting pot is filled with water and a central spacer member is placed into the melting pot so that a bottom portion of the pouring container is surrounded by water. A glass thermometer is inserted into the pouring container to measure the temperature of the candle wax as it is being melted from flakes to liquid. A flame such as from a burner of a gas top stove is lit under the melting pot so that as the water is heated, the heat is transferred to the pouring container and the temperature of the candle wax is carefully measured to be sure that the candle wax flakes are being melted in the above described temperature range. Scent can be added into the candle wax while the wax flakes are being melted or after the candle wax flakes have been melted into a viscous liquid. It will be appreciated that this is only one example of melting the candle wax flakes, with or without scent, into a viscous liquid to pour the melted candle wax into a wax container such as a transparent jar.

Figure 1:
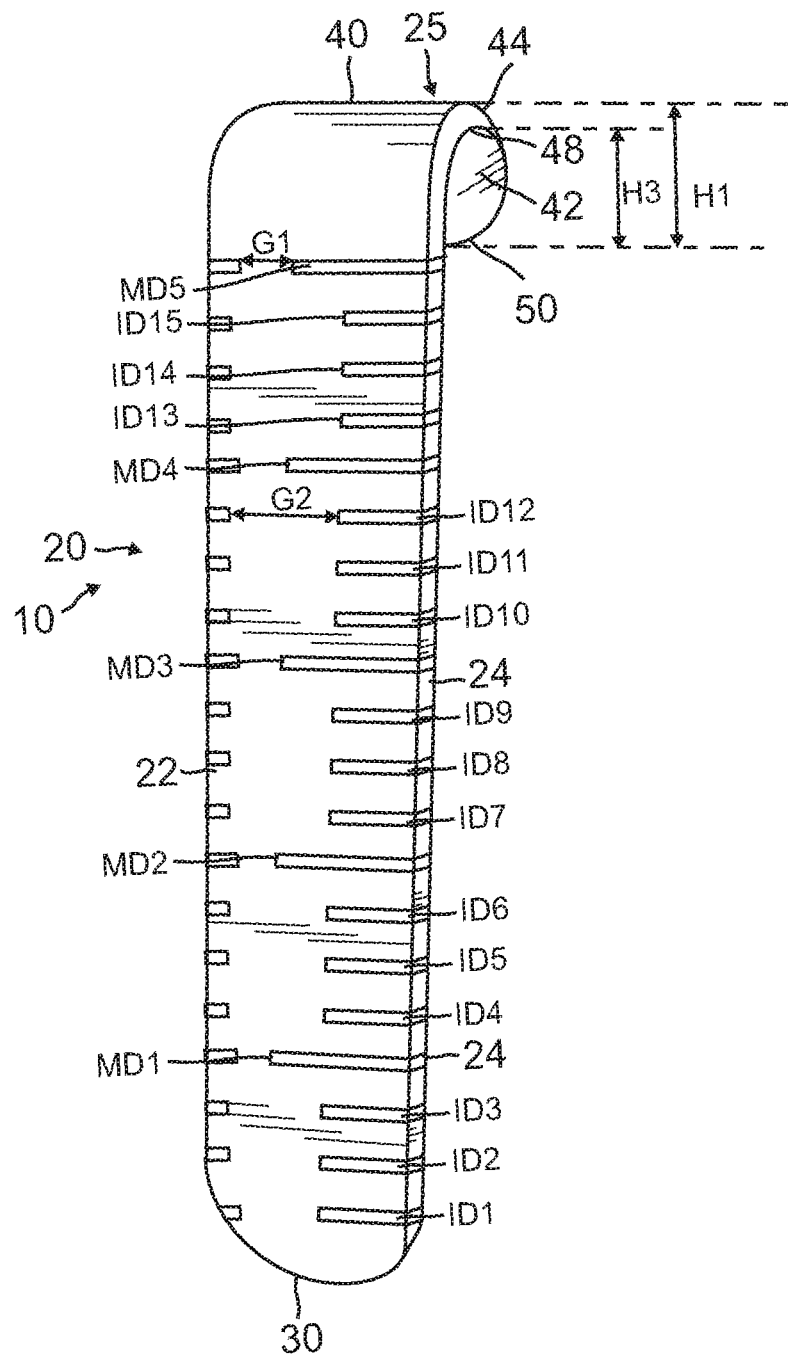
FIG. 1 is a front and first side perspective view of a first embodiment of the present invention measuring apparatus illustrating distance markers on the front surface and first side of the measuring apparatus, and the top of the measuring apparatus being hooked between the retaining portion and the marked distance measuring portion, with the lowermost tip of the hook and the location where the hooked top of the measuring apparatus rests on the circumference of the container into which the hot wax is poured of a sufficient distance to prevent the measuring apparatus from falling off the container.

Referring to FIG. 1, there is illustrated a front and first side perspective view of a first embodiment of the present invention candle wax measuring apparatus 10 including a longitudinal body 20 having a front surface 22 and a first side surface 24. The body 20 can be made of opaque or transparent material. Preferably, the body 20 is made of a low thermal conductivity material such as plastic, wood, glass, or concrete. Thermal conductivity of materials is measured typically in units of watts per meter per degree Kelvin. The higher the thermal conductivity (k) the easier the material becomes hot when exposed to heat. Light weight Metals for example typically have very high K values and materials such as sand or concrete typically will have low K values.

The candle wax measuring apparatus includes distance markers including at least main distance markers MD1, MD2, MD3, MD4 and MD5 on the front surface 22 and interim distance markers ID1, ID2, ID3, ID4, ID5,ID6, ID7,ID8, ID9, ID10, ID11, ID12, ID13, ID14 and ID15 on the front surface 22. At least some and preferably all of the main distance markers and interim distance markers extend onto first side surface 24. In a preferred embodiment, there is a horizontal gap between portions of each distance markers, with a gap "G1" between portions of the main distance markers and a gap "G2" between portions of interim distance markers. The longitudinal body 20 has a bottom surface 30 and a top surface 40. By way of example, MD1 is approximately one inch from the bottom surface 30 and MD2, MD3, MD4 and MD5 are spaced approximately one (1) inch apart. The top portion 25 of the measuring apparatus 10 is hooked having a topmost end 40, a hook exterior surface 44, a hook interior surface 42 (see FIG. 4) with a hook topmost interior portion 48 and terminating in a hook tip 50. When the hook portion 25 of the measuring apparatus 10 is placed over the outer circumference 130 of a container 100 into which hot wax is poured (see FIG. 3), there are two critical distances. The distance from the hook tip 50 to the topmost exterior portion 44 is (H1). The distance from the hook tip 50 to the topmost interior portion 48 (H3) must be of a sufficient height or distance to prevent the measuring apparatus 10 from falling off the container while hot candle wax is being poured into the container. The preferred distance for (H3) is ⅜ inch. The minimum distance for (H3) is usually at least ¼ of an inch. Also the uppermost distance marker, whether it is a main distance marker such as MD5 or an interim distance marker such as ID15 must be just below the hook tip 50 of hook 25 to prevent hot candle wax from being poured into a level where the hot candle wax comes in contact with hook tip 50.

There is a gap "G1" between portions of the main distance markers and a gap "G2" between portions of the interim distance markers. The main distance markers are preferably spaced one inch apart. The interim distance markers are preferably spaced one-quarter (¼) inch apart. It will be appreciated that the Figures are drawn for illustrative purposes and not to scale. It is also within the spirit and scope of the present invention for the main distance markers to be spaced apart by more or less than one (1) inch and the interim distance markers to be spaced apart by more or less than one-quarter (¼) inch.

Figure 2:
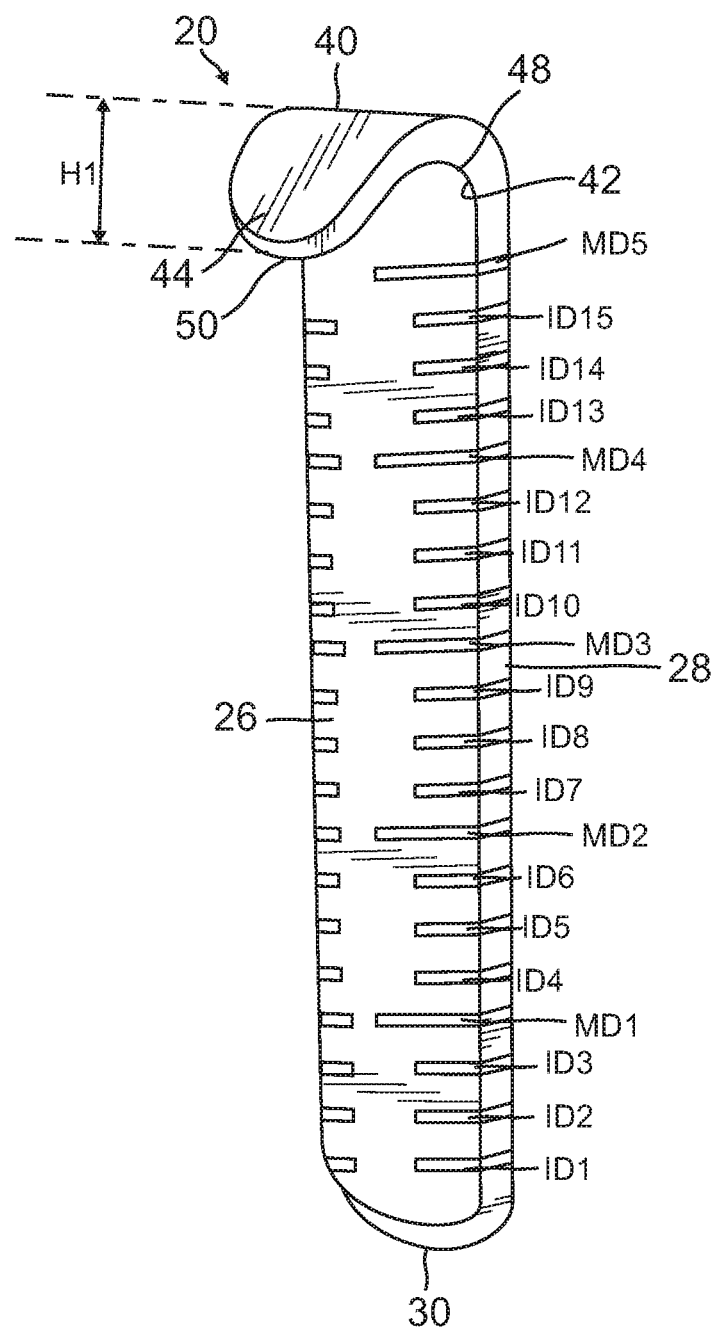
FIG. 2 is a rear and second side perspective view of a first embodiment of the present invention measuring apparatus illustrating distance markers on the rear surface and second side of the measuring apparatus, and the top of the measuring apparatus being curved between the retaining portion and the marked distance measuring portion, with the lowermost tip of the hook and the location where the hooked top of the measuring apparatus rests on the circumference of the container into which the hot wax is poured of a sufficient distance to prevent the measuring apparatus from falling off the container.

Referring to FIG. 2, there is illustrated a rear and second side perspective view of a first embodiment of the present invention measuring apparatus 10, illustrating corresponding main distance markers MD1, MD2, MD3, MD4, and MD5 on the rear surface 26 which correspond to the main distance markers on the front surface 22, and interim distance markers ID1, ID2, ID3, ID4, ID5, ID6, ID7, ID8, ID9, ID10, ID11, ID12, ID13, ID14 and ID15 which correspond to the interim distance markers on the front surface 22. The markers on the rear surface 26 extend onto second side surface 28. The gaps "G1" and "G2" and height "H1" and alignment of the uppermost distance marker just below hook tip 50 of hook portion 25 also apply to the FIG. 2 illustration.

Figure 3:
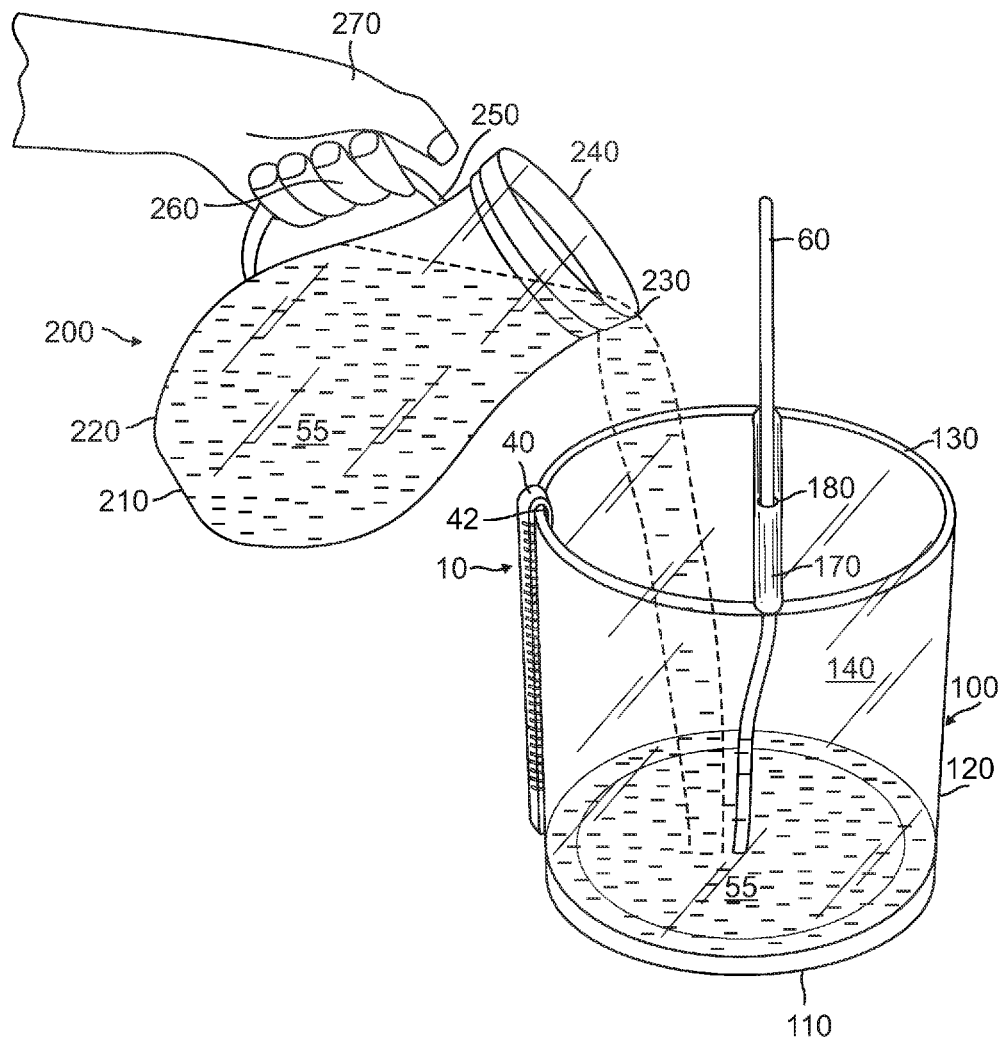
FIG. 3 is a side perspective view of the first embodiment of the present invention with hot candle wax being poured into a container which is a glass jar having a given height and diameter and a wick retaining member retaining a wick as the hot wax is being poured into the container, with the top surface of the wax below the lowermost tip of the hook of the measuring apparatus.

Referring to FIG. 3, there is illustrated a side perspective view of the first embodiment of the candle wax measuring apparatus 10 with hot viscous candle wax 55 being poured from a pouring container 200 into a candle container 100 which as illustrated is a glass jar having a bottom wall 110, a sidewall 120 and upper circumferential surface 130, with an interior chamber 140 into which the viscous hot candle wax 55 is poured. The pouring container 200 has walls such as bottom wall 210 and sidewall 220 leading to a top wall 240 having pouring lip 230. The handle 250 is preferably made of non-heat conducting material. While the illustration shows the handle 250 being grasped by fingers generally designed as 260 of a hand 270, it will be appreciated that the user will have on gloves, a pot holder, etc. to protect the user's hand. A wick retainer 170 is supported on the upper circumferential surface 130 of candle container 100. The wick retainer 170 has a retaining portion 180 to retain the wick 60 in an elevated condition within interior chamber 140 of candle wax container 100 while hot viscous candle wax 55 is poured into the interior chamber 140 of candle wax container The present invention measuring apparatus is retained onto the upper circumferential surface 130 of the candle wax container 100 by having the topmost interior portion 48 of hooked portion 25 resting on upper circumferential surface 130 while hook tip 50 is within interior chamber and interior or rear surface 26 rests against exterior sidewall 120 of candle wax container 100. Since the candle wax container 100 is preferably transparent, all of the main line markers and interim line markers previously discussed are visible from at least the front surface 22, first side surface 24, rear surface 26 and second side surface 28 of the measuring apparatus 10 to enable the user to pour in the melted hot wax from any orientation relative to the candle wax container 100. The interior surface 26 of the measuring apparatus will become less visible as the interior chamber 140 is filled with hot liquid melted wax 55. The measuring distance markers must be on at least one surface (22, 24, 26 and 28) with at least one set of main distance markers or a set of interim distance markers on at least one surface.

Figure 4:
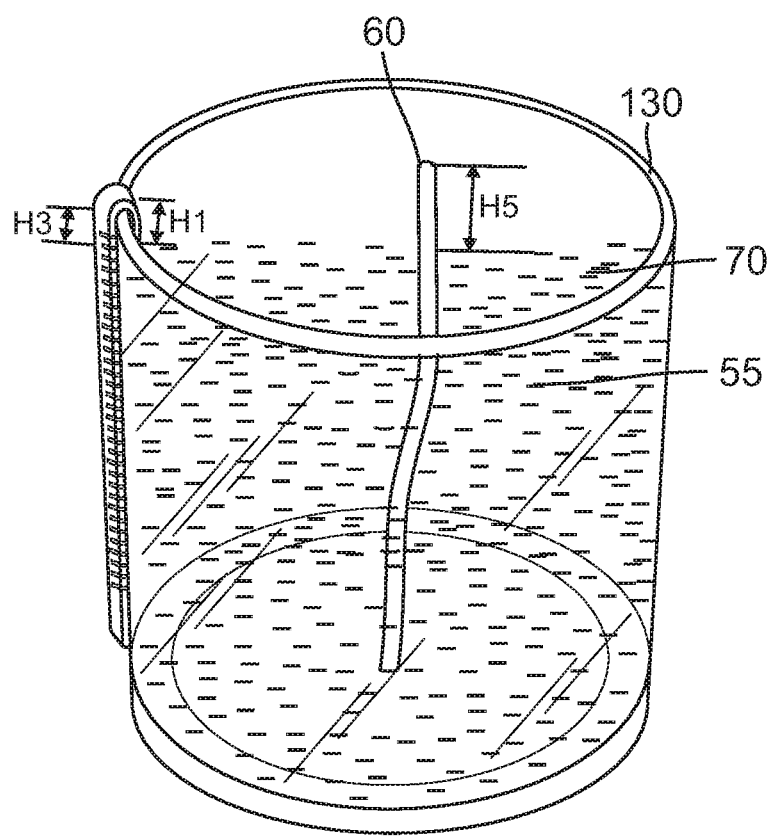
FIG. 4 is a side perspective view of the first embodiment of the present invention after hot candle wax has been poured into the container and the wax hardened, showing the measured upper circumferential surface of the candle wax at a given distance below the upper circumferential surface of the container and the wick cut at a desired height above the upper circumferential surface of the hardened candle wax and below the upper circumferential surface of the container with the top surface of the wax below the lowermost tip of the hook of the measuring apparatus.

Referring to FIG. 4, there is illustrated a side perspective view of the first embodiment of the candle wax measuring apparatus 10 after hot candle wax 55 has been poured into the interior chamber 140 of candle wax container 100 and the wax hardened, showing the measured upper surface 70 of the candle wax 55 at a given distance H3 below upper circumferential surface 130 of the candle wax container 100 and the wick 60 cut at a desired height H5 above the top surface 70 of the hardened candle wax 55 and below the upper circumferential surface 130 of the candle wax container 100. The top surface 70 is poured to a level no higher than the uppermost distance marker just below hook tip 50. It is within the spirit and scope of the present invention for the hot candle wax to be poured to any level of a distance mark.

Therefore, through the present invention measuring apparatus 10, hand poured viscous liquid candle wax 55 can be poured to the exact distance desired so that the top surface 70 of the candle wax 55 is at the desired distance below the upper circumferential surface 130 of the candle wax container 100, but no higher than hook tip 50. The distance which is usually from the uppermost main marker MD5 and lower straight surface hook lower straight surface 48 corresponding to the upper circumferential surface 130 of the candle wax container 100 is viewed and measured from any angle at which the hot melted candle wax container 200 is held relative to the candle wax container 100.

Figure 5:
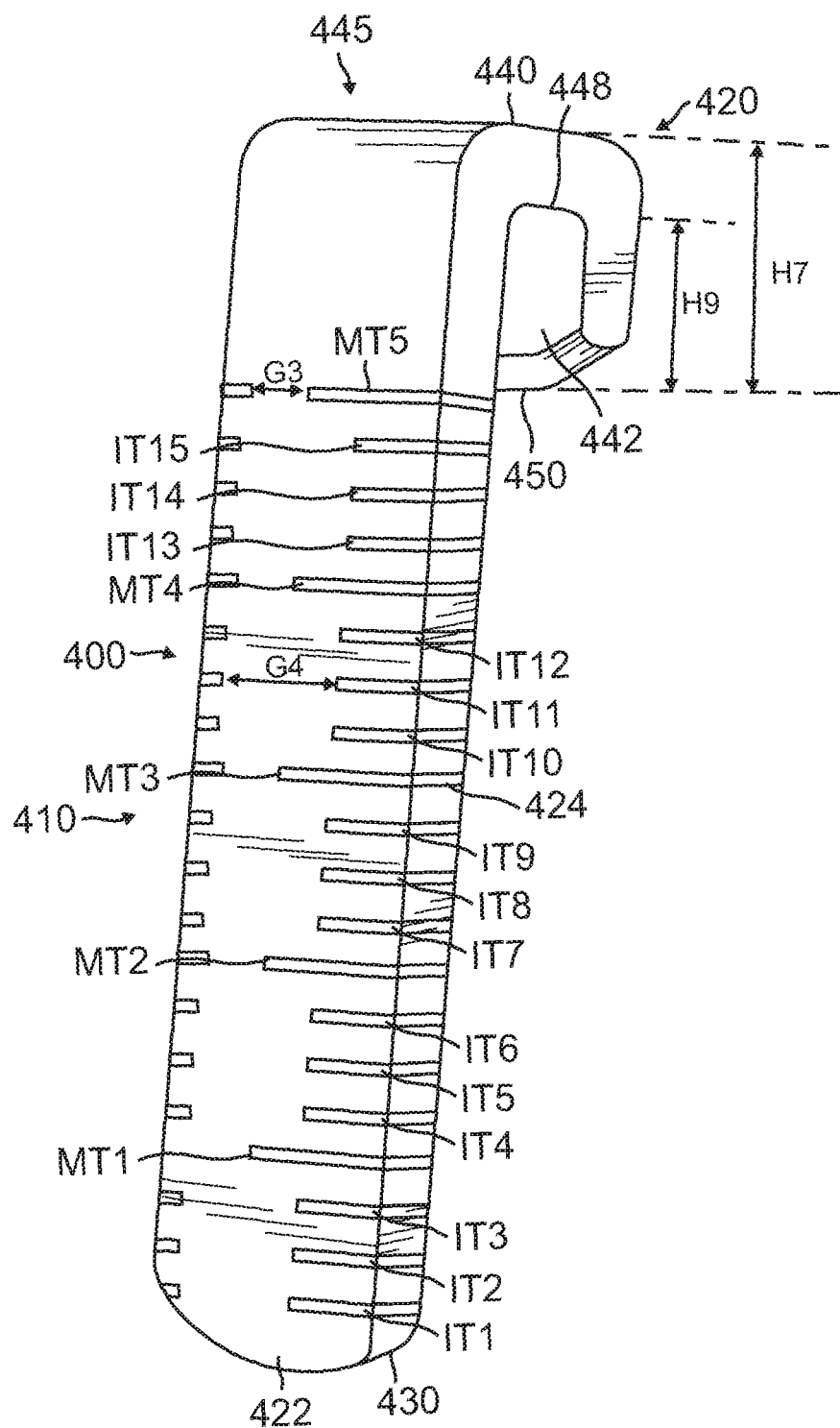
FIG. 5 is a front and first side perspective view of a second embodiment of the present invention measuring apparatus illustrating distance markers on the front surface and first side of the measuring apparatus, and the top of the measuring apparatus being hooked with a straight horizontal portion where the hook rests on the circumference of container into which the hot was is being poured, with the lowermost tip of the hook and the location where the hooked top of the measuring apparatus rests on the circumference of the container into which the hot wax is poured of a sufficient distance to prevent the measuring apparatus from falling off the container.

Referring to FIG. 5, there is illustrated a front and first side perspective view of a second embodiment of the present invention candle wax measuring apparatus 410 including a longitudinal body 420 having a front surface 422 and a first side surface 424. The body 420 can be made of opaque or transparent material. Preferably, the body 420 is made of non-heat conducting material such as plastic. The candle wax measuring apparatus includes distance markers including at least main distance markers MT1, MT2, MT3, MT4 and MT5 on the front surface 422 and interim distance markers IT1, IT2, IT3, IT4, IT5,IT6, IT7, IT8, IT9, IT10, IT11, IT12, IT13, IT14 and IT15 on the front surface 422. At least some and preferably all of the main distance markers and interim distance markers extend onto first side surface 424. In a preferred embodiment, there is a horizontal gap between portions of each distance marker, with a gap "G3" between portions of the main distance markers and a gap "G4" between portions of interim distance markers. The longitudinal body 420 has a bottom surface 430 and a top surface 440. By way of example, MT1 is approximately one inch from the bottom surface 430 and MT2, MT3, MT4 and MT5 are spaced approximately one (1) inch apart. The top portion 425 of the measuring apparatus 410 is hooked having a hook topmost end 440, a hook exterior surface 444, a hook interior surface 442 and terminating in a hook tip 450. When the hook portion 425 of the measuring apparatus 410 is placed over the outer circumference of a container into which hot wax is poured, there are two critical distances. The distance from the hook tip 450 to the topmost horizontal exterior portion 440 is (H7). The distance from the hook tip 450 to the topmost horizontal interior portion 448 (H9) must be of a sufficient height or distance to prevent to measuring apparatus 410 from falling off the container while hot candle wax is being poured into the container. The preferred distance for "H9" is ⅜ inch. The minimum distance for "H9" is usually at least ¼ of an inch. Also the uppermost distance marker, whether it is a main distance marker such as MT5 or an interim distance marker such as ID15 must be just below the hook tip 450 of hook 425 to prevent hot candle wax from being poured into a level where the hot candle wax comes in contact with hook tip 450.

The main distance markers are preferably spaced one inch apart. The interim distance markers are preferably spaced one-quarter (¼) inch apart. It will be appreciated that the figures are drawn for illustrative purposes and not to scale. It is also within the spirit and scope of the present invention for the main distance markers to be spaced apart by more or less than one (1) inch and the interim distance markers to be spaced apart by more or less than one-quarter (¼) inch.

Figure 6:
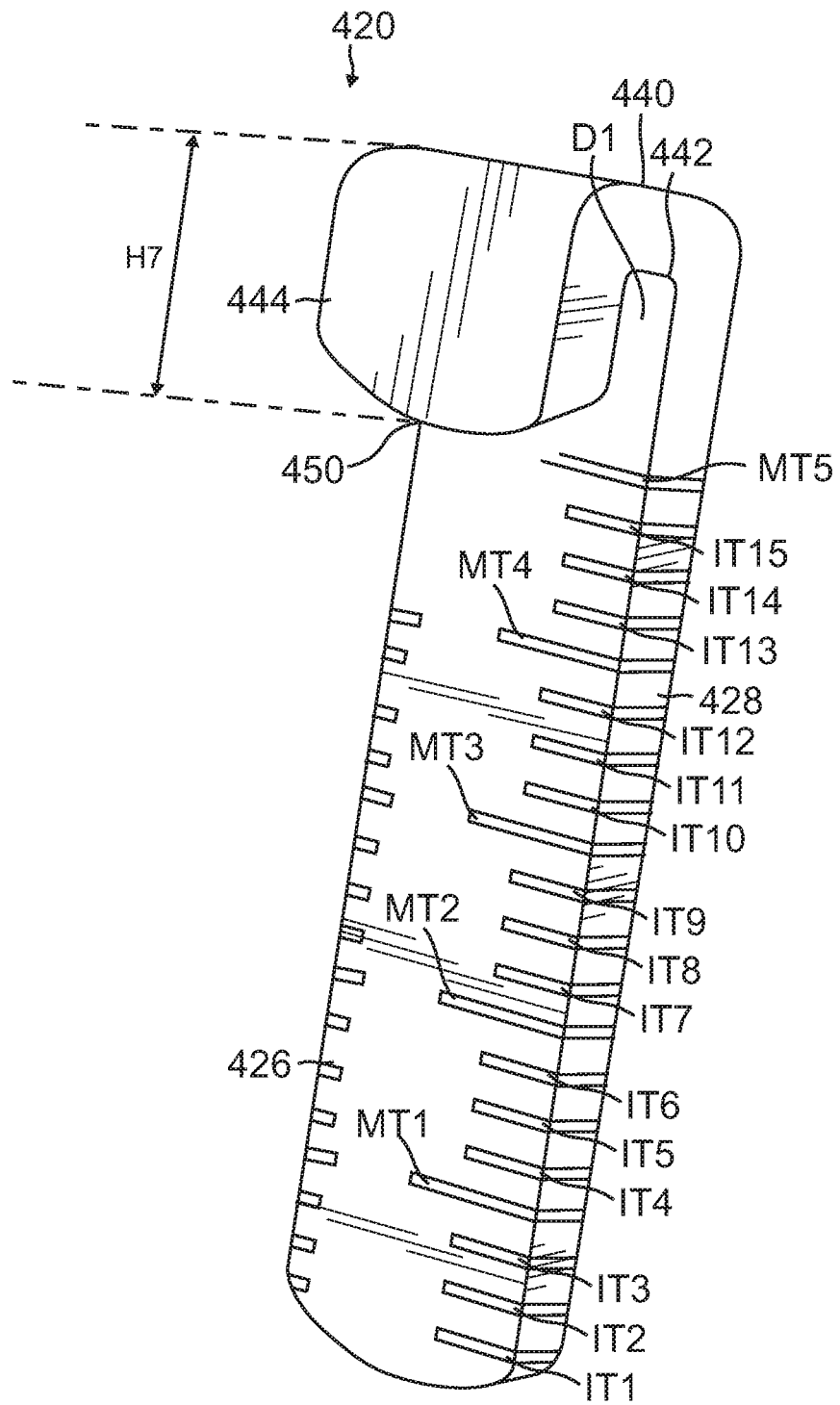
FIG. 6 is a rear and second side perspective view of a second embodiment of the present invention measuring apparatus illustrating distance markers on the rear surface and second side of the measuring apparatus, and the top of the measuring apparatus being hooked with a straight horizontal portion where the hook rests on the circumference of container into which the hot was is being poured, with the lowermost tip of the hook and the location where the hooked top of the measuring apparatus rests on the circumference of the container into which the hot wax is poured of a sufficient distance to prevent the measuring apparatus from falling off the container.

Referring to FIG. 6, there is illustrated a rear and second side perspective view of a second embodiment of the present invention measuring apparatus 410, illustrating corresponding main distance markers MT1, MT2, MT3, MT4, and MT5 on the rear surface 426 which correspond to the main distance markers on the front surface 422, and interim distance markers IT1, IT2, IT3, IT4, IT5, IT6, IT7, IT8, IT9, IT10, IT11, IT12, IT13, IT14 and IT15 which correspond to the interim distance markers on the front surface 422. The markers on the rear surface 426 extend onto second side surface 428. The gaps "G3" and "G4" and height "H7" and alignment of the uppermost distance marker just below hook tip 450 of hook portion 425 also apply to the FIG. 6 illustration.

Figure 7:
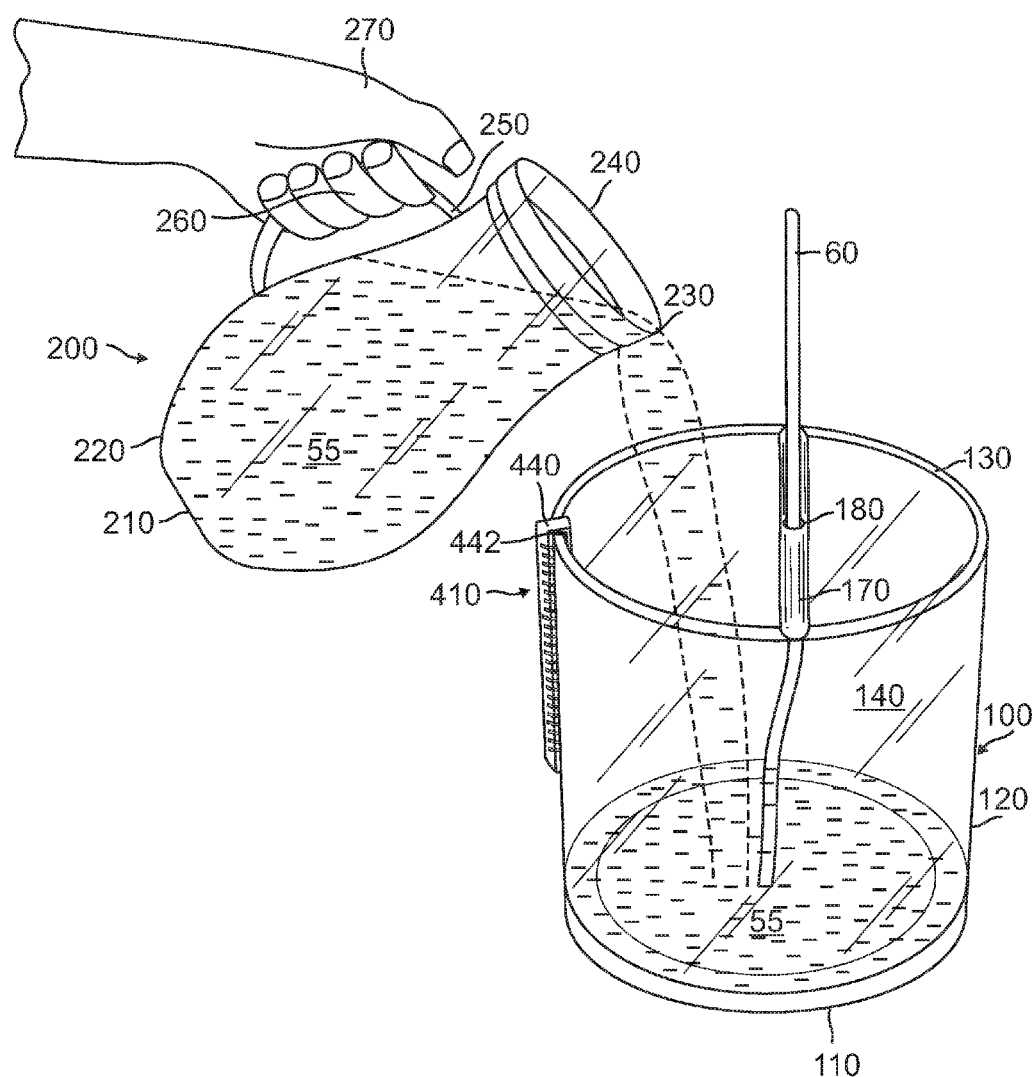
FIG. 7 is a side perspective view of the second embodiment of the present invention with hot candle wax being poured into a container which is a glass jar having a given height and diameter and a wick retaining member retaining a wick as the hot wax is being poured into the container, with the top surface of the wax being below the lowermost tip of the hook of the measuring apparatus.

Referring to FIG. 7, there is illustrated a side perspective view of the second embodiment of the candle wax measuring apparatus 410 with hot viscous candle wax 55 being poured from a pouring container 200 into a candle container 100 which as illustrated is a glass jar having a bottom wall 110, a sidewall 120 and upper circumferential surface 130, with an interior chamber 140 into which the viscous hot candle wax 55 is poured. The pouring container 200 has walls such as bottom wall 210 and sidewall 220 leading to a top wall 240 having pouring lip 230. The handle 250 is preferably made of non-heat conducting material. While the illustration shows the handle 250 being grasped by fingers generally designed as 260 of a hand 270, it will be appreciated that the user will have on gloves, a pot holder, etc. to protect the user's hand. A wick retainer 170 is supported on the upper circumferential surface 130 of candle container 100. The wick retainer 170 has a retaining portion 180 to retain the wick 60 in an elevated condition within interior chamber 140 of candle wax container 100 while hot viscous candle wax 55 is poured into the interior chamber 140 of candle wax container 100.

The present invention measuring apparatus is retained onto the upper circumferential surface 130 of the candle wax container 100 by having the hook lower straight surface 448 of hooked portion 425 resting on upper circumferential surface 130 while hook tip 450 is within interior chamber and interior or rear surface 426 rests against exterior sidewall 120 of candle wax container 100. Since the candle wax container 100 is preferably transparent, all of the main line markers and interim line markers previously discussed are visible from at least the front surface 422, first side surface 424, rear surface 426 and second side surface 428 of the measuring apparatus 410 to enable the user to pour in the melted hot wax from any orientation relative to the candle wax container 100. The interior surface 426 of the measuring apparatus will become less visible as the interior chamber 140 is filled with hot liquid melted wax 55. The measuring distance markers must be on at least one surface (422, 424, 426 and 428) with at least one set of main distance markers or a set of interim distance markers on at least one surface.

Figure 8:
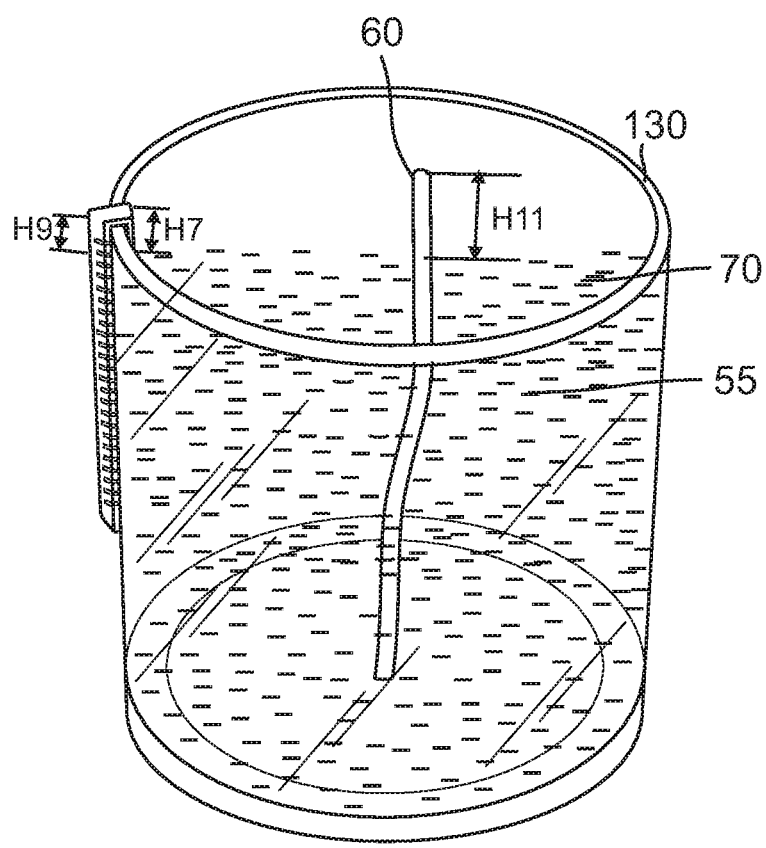
FIG. 8 is a side perspective view of the second embodiment of the present invention after hot candle wax has been poured into the container and the wax hardened, showing the measured upper circumferential surface of the candle wax at a given distance below the upper circumferential surface of the container and the wick cut at a desired height above the upper circumferential surface of the hardened candle wax with the top surface of the wax being below the lowermost tip of the hook of the measuring apparatus.

Referring to FIG. 8, there is illustrated a side perspective view of the second embodiment of the candle wax measuring apparatus 410 after hot candle wax 55 has been poured into the interior chamber 140 of candle wax container 100 and the wax hardened, showing the measured upper surface 70 of the candle wax 55 at a given distance H7 below upper circumferential surface 130 of the candle wax container 100 and the wick 60 cut at a desired height H11 above the top surface 70 of the hardened candle wax 55 and below the upper circumferential surface 130 of the candle wax container 100. The top surface 70 is poured to a level no higher than the uppermost distance marker just below hook tip 450. It is within the spirit and scope of the present invention for the hot candle wax to be poured to any level of a distance marker.

Therefore, through the present invention measuring apparatus 10, hand poured viscous liquid candle wax 55 can be poured to the exact distance desired so that the top surface 70 of the candle wax 55 is at the desired distance below the upper circumferential surface 130 of the candle wax container 100, but no higher than tip hook 450. The distance which is usually from the uppermost main marker MD5 and hook lower straight surface 448 corresponding to the upper circumferential surface 130 of the candle wax container 100 is viewed and measured from any angle at which the hot melted candle wax container 200 is held relative to the candle wax container 100.

The present invention measuring apparatus is retained onto the upper circumferential surface 130 of the candle wax container 100 by having hook lower straight surface 448 rest on upper circumferential surface 130 while the hook tip 450 hook retaining portion 425 is within interior chamber 140 and rear surface 426 rests against exterior sidewall 120 of candle wax container 100. The hook lower straight surface 448 enables the present invention measuring apparatus 410 to accommodate candle wax containers having different sidewall 120 thickness and upper circumferential surface 130. The distance between interior surface 446 and rear surface 426 is Dl. Since the candle wax container 100 is preferably transparent, all of the main line markers and interim line markers previously discussed are visible from at least the front surface 422, first side surface 424 and second side surface 428 of the measuring apparatus 410 to enable the user to pour in the melted hot wax 50 from any orientation relative to the candle wax container 100. The interior or rear surface 426 of the measuring apparatus will become less visible as the interior chamber 140 is filled with hot liquid melted wax 55.

Referring to FIG. 8, there is illustrated a side perspective view of the second embodiment of the present invention 410 after hot candle wax 55 has been poured into the interior chamber 140 of candle wax container 100 and the wax hardened, showing the measured top surface 70 of the candle wax 55 at a given distance H7 below the upper circumferential surface 130 of the candle wax container 100 and the wick 60 cut at a desired height H11 above second top surface 70 of the hardened candle wax 55 and below the upper circumferential surface 130 of the candle wax container.

Therefore, through the present invention measuring apparatus 410, liquid candle wax 55 can be poured to the exact distance desired so that the top surface 70 of the candle wax 55 is at the desired distance below the upper circumferential surface 130 of the candle wax container 100. The distance which is usually from the uppermost main marker MT5 and hook vertical surface 442 corresponding to the upper circumferential surface 130 of the candle wax container 100 is viewed and measured from any angle at which the hot melted candle wax container 200 is held relative to the candle wax container 100.

The invention which is depicted in FIGS. 1, 2, 5 and 6 is the measuring device which has thereon scales which can be on the front surface, the interior or rear back, surface and both side surfaces and also can be transparent as well as opaque and terminates in a hook member which is hooked over the top edge of the upper circumferential surface of the candle wax container as illustrated and discussed above for both the first and second embodiments of the present invention measuring apparatus.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which this invention might be embodied or operated.

What is claimed is:

1. A measuring apparatus used in conjunction with a candle container having a bottom wall, a transparent sidewall extending from said bottom wall to an upper circumferential surface and an interior chamber within the candle container, and a pouring container used to pour hot melted candle wax into said interior chamber of said candle container, the measuring apparatus comprising:
   a. a longitudinal body having a bottom, a top surface, a front surface, a first side surface, a rear surface and a second side surface, a multiplicity of spaced apart main distance markers on said front surface extending to said first sidewall and extending to said rear wall, a multiplicity of interim distance markers at spaced apart locations on between said interim distance markers and below a lowermost main distance marker, the interim distance markers extending from said front surface to said first side surface to said rear surface, an uppermost most one of either said main distance markers or interim distance markers at a first given distance from said top surface;
   b. said top of said longitudinal body extending to a hook member having a lower tip and having a second given distance from said hook to said top surface; and
   c. whereby said bottom surface of said top surface rests on said upper circumferential surface of said candle container and said main distance markers and said interim distance markers are visible from said longitudinal body front surface, first side surface and rear surface when the hot melted wax poured into said interior chamber of said candle holder to a level at a selected one of said multiplicity of main distance markers or selected one of said interim distance markers.

2. The measuring apparatus in accordance with claim 1, further comprising:
   a. said multiplicity of main distance markers extend to said second sidewall of said longitudinal body;
   b. said multiplicity of interim distance markers extend to said second sidewall of said longitudinal body.

3. The measuring apparatus in accordance with claim 1, further comprising: said bottom surface of said top of said longitudinal body is curved; whereby said rear surface of said longitudinal body is pressed against said sidewall of said candle container and said hooked retaining member is pressed against an interior surface of said sidewall of said candle holder.

4. The measuring apparatus in accordance with claim 1, further comprising: said bottom surface of said top of said longitudinal body is straight; whereby said bottom surface accommodates a container top surface and sidewall of varying thickness up to the second given distance, the rear surface of said longitudinal body adjacent said sidewall of the candle container and said hooked retaining member adjacent said upper circumferential surface of said candle holder and within said interior chamber of said candle holder.

5. The measuring apparatus in accordance with claim 1 further used in conjunction with a wick extending from the interior chamber and retained above the upper circumferential surface of said candle holder by a retaining member, further comprising: after the wax hardens, the wick is cut to extend above the upper circumferential surface of said hardened wax and below said upper circumferential surface of said candle holder.

6. The measuring apparatus in accordance with claim 1, further comprising: said main distance markers are set one (1) inch apart.

7. The measuring apparatus in accordance with claim 1, further comprising: said interim, distance markers are set one-quarter (¼) of an inch apart.

8. A measuring apparatus used in conjunction with a candle container having a bottom wall, a transparent sidewall extending from said bottom wall to an upper circumferential surface and an interior chamber within the candle container, and a pouring container used to pour hot melted candle wax into said interior chamber of said candle container with the measuring apparatus comprising:
   a. a longitudinal body being longitudinal and having a bottom surface and a top member, a front surface, a first side surface, a rear surface and a second side surface, a multiplicity of spaced apart main distance markers on said front surface and a multiplicity of interim distance markers at spaced apart locations on said front surface at least between said main distance markers
   b. said top member of said longitudinal body including a top surface with a bottom surface having a second given distance between a hooked retaining member extending from said top and said longitudinal body; and
   c. whereby said bottom surface of said top member rests on said upper circumferential surface of said candle container and said main distance markers and said interim distance markers are visible from said longitudinal body front surface, and hot melted wax is poured into said interior chamber of said candle holder to a level at a selected one of said multiplicity of main distance markers or selected one of said interim distance markers set at a desired height below said upper circumferential surface of said candle holder so that an upper circumferential surface of said candle wax is formed at said desired height when the hot melted wax hardens.

9. The measuring apparatus in accordance with claim 8, further comprising: said multiplicity of spaced apart main distance markers extend onto said first side surface.

10. The measuring apparatus in accordance with claim 9, further comprising:
   a. said multiplicity of main distance markers extend to said second sidewall of said longitudinal body; and
   b. said multiplicity of interim distance markers extend to said second sidewall of said longitudinal body.

11. The measuring apparatus in accordance with claim 9, further comprising: said bottom surface of said top of said longitudinal body is curved; whereby said rear surface of said longitudinal body is pressed against said sidewall of said candle container and said hooked retaining member is pressed against an interior surface of said sidewall of said candle holder.

12. The measuring apparatus in accordance with claim 8, further comprising: said multiplicity of spaced apart main distance markers and interim distance markers are on the rear surface and correspond with respective main distance markers and interim distance markers on said front surface.

13. The measuring apparatus in accordance with claim 8, further comprising: said bottom surface of said top of said longitudinal body is straight; whereby said bottom surface accommodates a container top surface and sidewall of varying thickness up to the second given distance, the rear surface of said longitudinal body adjacent said sidewall of the candle container and said hooked retaining member adjacent said upper circumferential surface of said candle holder and within said interior chamber of said candle holder.

14. The measuring apparatus in accordance with claim 8, further used in conjunction with a wick extending from the interior chamber and retained above the upper circumferential surface of said candle holder by a retaining member, further comprising: after the wax hardens, the wick is cut to extend above the upper circumferential surface of said hardened wax and below said upper circumferential surface of said candle holder.

15. The measuring apparatus in accordance with claim 8, further comprising: said interim, distance markers are set one-quarter (¼) of an inch apart.

* * * * *